(12) United States Patent
Asad et al.

(10) Patent No.: US 11,433,460 B1
(45) Date of Patent: Sep. 6, 2022

(54) CUTTING INSERT

(71) Applicant: Prince Mohammad Bin Fahd University, Dhahran (SA)

(72) Inventors: Muhammad Asad, Dhahran (SA); Muhammad Azhar Ali Khan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/510,943

(22) Filed: Oct. 26, 2021

(51) Int. Cl.
  *B23C 5/20* (2006.01)
  *B23B 27/16* (2006.01)

(52) U.S. Cl.
  CPC .......... *B23B 27/1622* (2013.01); *B23C 5/202* (2013.01); *B23B 2200/083* (2013.01); *B23B 2200/202* (2013.01); *B23C 2200/0416* (2013.01)

(58) Field of Classification Search
  CPC .......... B23B 27/1622; B23B 2200/083; B23B 2200/202; B23B 27/04; B23B 27/164; B23C 5/202; B23C 2200/0416; B23C 2200/361; B23C 2200/123; B23C 2200/203; B23C 2265/36
  See application file for complete search history.

(56) References Cited

U.S. PATENT DOCUMENTS

| | | | | |
|---|---|---|---|---|
| 4,812,087 A * | 3/1989 | Stashko | ................ | B23C 5/2213 407/53 |
| 4,840,518 A | 6/1989 | Plutschuck et al. | | |
| 5,333,972 A * | 8/1994 | Bernadic | ................ | B23B 27/141 407/113 |
| 5,454,671 A * | 10/1995 | Qvarth | .................... | B23C 5/202 407/42 |
| 5,924,824 A * | 7/1999 | Satran | .................... | B23C 5/202 407/62 |
| 6,120,219 A * | 9/2000 | Satran | ....................... | B23C 5/22 407/115 |
| 7,101,121 B2 | 9/2006 | Wermeister et al. | | |
| 7,229,236 B2 * | 6/2007 | Craig | .................... | B23C 5/109 407/113 |
| 7,775,750 B2 * | 8/2010 | Satran | .................... | B23C 5/202 407/42 |
| 8,308,399 B2 * | 11/2012 | Yoshida | ................ | B23F 21/146 407/26 |

(Continued)

FOREIGN PATENT DOCUMENTS

| | | | | |
|---|---|---|---|---|
| DE | | 2224529 C2 | 12/1982 | |
| DE | | 19743971 A1 * | 4/1999 | ............... B23C 3/06 |

(Continued)

*Primary Examiner* — Sara Addisu
(74) *Attorney, Agent, or Firm* — Oblon, McClelland, Maier & Neustadt, L.L.P.

(57) ABSTRACT

A cutting insert of a substantially horizontal cylindrical segment shape may include top and bottom surfaces having a circular segment shape. The cutting insert may include a convex side and a flat side. The cutting insert may include a top cutting edge which is formed where the convex side and the top surface meet, and a bottom cutting edge which is formed where the convex side and the bottom surface meet. The cutting insert may include a hole extending from the convex side towards the flat side. The hole may be positioned at a center of a surface of the flat side.

20 Claims, 10 Drawing Sheets

(56) References Cited

U.S. PATENT DOCUMENTS

| | | | | |
|---|---|---|---|---|
| 8,317,435 | B2* | 11/2012 | Heinloth | B23C 5/202 |
| | | | | 407/113 |
| 8,814,479 | B2 | 8/2014 | Kaufmann | |
| 8,858,132 | B2* | 10/2014 | Heinloth | B23C 3/06 |
| | | | | 407/115 |
| 9,597,740 | B2* | 3/2017 | Gamble | B23C 5/06 |
| 9,981,330 | B2* | 5/2018 | Sjoo | B23F 21/066 |
| 10,105,760 | B2* | 10/2018 | Joo | B23B 27/1662 |
| 10,682,709 | B2* | 6/2020 | Larsson | B23B 27/1677 |
| 2003/0113175 | A1* | 6/2003 | Wermeister | B23C 5/2213 |
| | | | | 407/113 |
| 2003/0165363 | A1* | 9/2003 | Wermeister | B23C 5/2213 |
| | | | | 407/115 |
| 2004/0202515 | A1* | 10/2004 | Satran | B23C 5/12 |
| | | | | 407/113 |
| 2006/0165501 | A1* | 7/2006 | Heinloth | B23C 5/2213 |
| | | | | 409/199 |
| 2006/0269366 | A1* | 11/2006 | Rieth | B23C 5/2213 |
| | | | | 407/113 |
| 2010/0183386 | A1* | 7/2010 | Heinloth | B23B 27/145 |
| | | | | 407/113 |
| 2012/0070238 | A1* | 3/2012 | Men | B23C 5/1045 |
| | | | | 407/120 |
| 2012/0269588 | A1* | 10/2012 | Kaufmann | B23C 5/2213 |
| | | | | 407/100 |
| 2016/0082527 | A1* | 3/2016 | Komiyama | B23C 5/202 |
| | | | | 407/115 |
| 2022/0048120 | A1* | 2/2022 | Schulte | B23F 21/166 |

FOREIGN PATENT DOCUMENTS

| | | | | |
|---|---|---|---|---|
| DE | 100 17 645 A1 | 10/2001 | | |
| JP | 2017196692 A | * 11/2017 | | B23B 1/00 |
| WO | 2021/049786 A1 | 3/2021 | | |

* cited by examiner

PRIOR ART

CUTTING INSERT

BACKGROUND

Technical Field

The present disclosure is directed to cutting tools, and more particularly to a cutting insert adapted to be implemented in the cutting tools for machining a workpiece.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metal machining cutting tools use cutting inserts made from quality materials that can be operated at high speeds and handle rapid feed rates. Common shapes of cutting inserts include square, triangular and rhombus (diamond) providing four, three and two cutting edges, respectively, on each side of the insert. Conventional cutting inserts have straight cutting edges. In cutting operations, typically, a sharp and rough material is often left on workpiece edges after machining process, known as "end-burr" or "exit-burr", or sometimes simply as "burr". For instance, in most metal drilling operations, burrs are formed as the drill exits the workpiece. Burr is an undesirable projection of workpiece material at the edge of a machined surface. Formation of burr at the edge of a machined component may lead to misalignment of assembled parts, unsafe conditions during handling of machined components, malfunctioning of the product during operation, etc.

Deburring is usually employed after cutting to remove burrs formed during machining. Deburring consumes time and energy and hence negatively affects productivity. Deburring is difficult to automate and is usually performed manually. In some instances, particularly for precision parts, deburring and edge finishing can amount to as much as 30 percent of the manufacturing time of the machined component. Moreover, known deburring operations have not been found to be fully satisfactory to remove all interior burrs because of the different conditions under which burrs are formed. Therefore, elimination or minimization of burr formation during machining operation itself is desired for effectively reducing the need of the additional deburring process.

WO2021049786A1 describes a cutting insert that is interchangeably mounted in an insert pocket formed at an end portion of a cutting tool and is capable of cutting a workpiece, and having a cutting part which may include a first corner cutting edge formed to extend along a first corner side, which is one of the plurality of corner side parts, on a plane view; a first cutting edge formed to extend from one end of the first corner cutting edge in a convex curved shape along a pair of main side surfaces; a second cutting edge formed to extend in a linear shape along the pair of main side surfaces from one end of the first cutting edge; a third cutting edge formed to extend from one end of the second cutting edge to a convex curved shape having the same radius of curvature as the first cutting edge along the pair of main side surfaces. The design helps to enhance the stiffness of the cutting insert mounted in the insert pocket of the cutting tool and to smoothly inducing the discharge of cutting chips. However, this reference does not disclose a reduction in burr formation.

U.S. Pat. No. 4,840,518A describes a disposable indexable cutting insert having opposed irregularly curved cutting edges and a smooth continuous transition along each cutting edge and a corresponding radiused corner edge. The described cutting insert has been found to be particularly useful in the machining of titanium. However, this reference does not disclose a reduction in burr formation.

DE2224529C2 describes a flat sided, regular polygon cutting insert for metal removal. The cutting insert has a convex cutting face surface in the form of a frustum. This results in a cutting angle changing from a lower value at corners to a higher value at the center of the cutting edge. The reference discloses advantages when working hard surfaces and gives good shock loading resistance to the central cutting edge area. However, this reference does not disclose a reduction in burr formation.

DE10017645A1 describes a cutting insert, especially for milling camshafts, having at least one cutting edge. The cutting edge is composed of a plurality of cutting edge sections that have the following geometrical allocations when viewed from a planar top perspective of the face adjoining the cutting edge: a first, straight section, a second, straight section that adjoins the first section and that includes an angle of more than 90° and less than 180° with said first section, and a third cutting edge section that is convexly curved and that adjoins the end of the second section facing away from the first section and whose curved design, that may also consist of straight sub-sections offset with respect to one another, extends over an angular range of more than 90°. The reference discloses that the contour of the cutting edge ensures that the same insert can be used several times. However, this reference does not disclose a reduction in burr formation.

Each of the aforementioned references suffers from one or more drawbacks hindering their adoption. Accordingly, it is an object of the present disclosure to provide a cutting insert that may help with attenuation of burr, i.e., to decrease burr generation, during machining of metallic materials, and thus reduce the time and cost incurred in deburring processes and hence increase overall productivity.

SUMMARY

In one exemplary embodiment, a cutting insert of a substantially horizontal cylindrical segment shape is described. The cutting insert includes top and bottom surfaces having a circular segment shape. The cutting insert further includes a convex side. The cutting insert further includes a flat side. The cutting insert further includes a bottom cutting edge which is formed where the convex side and the bottom surface meet. The cutting insert further includes a top cutting edge which is formed where the convex side and the top surface meet. The cutting insert further includes a hole extending from the convex side towards the flat side, where the hole is positioned at a center of a surface of the flat side.

In some embodiments, the top and bottom surfaces are not parallel to each other.

In some embodiments, the top and bottom cutting edges have a curvature radius (R) ranging from about 4 mm to about 16 mm.

In some embodiments, the top and bottom cutting edges have a curvature radius (R) ranging from about 6 mm to about 12 mm.

In some embodiments, the top and bottom cutting edges have a curvature radius (R) of about 6 mm, about 8 mm, or about 12 mm.

In some embodiments, the top and bottom cutting edges have a curvature radius (R) of about 6 mm.

In some embodiments, a length of the circular segment shape is about 12.6 mm.

In some embodiments, the top and bottom cutting edges independently have a positive rake angle, or a negative rake angle.

In some embodiments, the top and bottom cutting edges each have the positive rake angle.

In some embodiments, the top and bottom cutting edges each have a positive rake angle ranging from about 5 degrees to about 25 degrees.

In some embodiments, the top and bottom cutting edges each have a positive rake angle of about 20 degrees.

In some embodiments, the cutting insert has a clearance angle ranging from about 3 degrees to about 15 degrees.

In some embodiments, the cutting insert has a clearance angle of about 7 degrees.

In some embodiments, a thickness of the cutting insert ranges from 2 mm to 20 mm, where the thickness is a longest distance between the flat side and the convex side, and the longest distance is perpendicular to the flat side.

In some embodiments, the thickness of the cutting insert is about 4.75 mm.

In some embodiments, the top and bottom cutting edges independently have a sharp edge or a round edge.

In some embodiments, the top and bottom cutting edges each have a sharp edge.

In some embodiments, the cutting insert comprises at least one hard material selected from the group consisting of a carbide, a cemented carbide, aluminum oxide, silicon nitride, cubic boron nitride, and diamond.

In another exemplary embodiment, a cutting tool that contains the above described cutting insert is described. The cutting tool contains a tool body having an insert mounting seat, and the cutting insert being detachably mounted on the insert mounting seat.

In some embodiments, the cutting tool further includes an insert holder, where the insert holder has a lateral mating surface complementary to the hole of the cutting insert, and the cutting insert is detachably mounted on the insert mounting seat via the insert holder.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
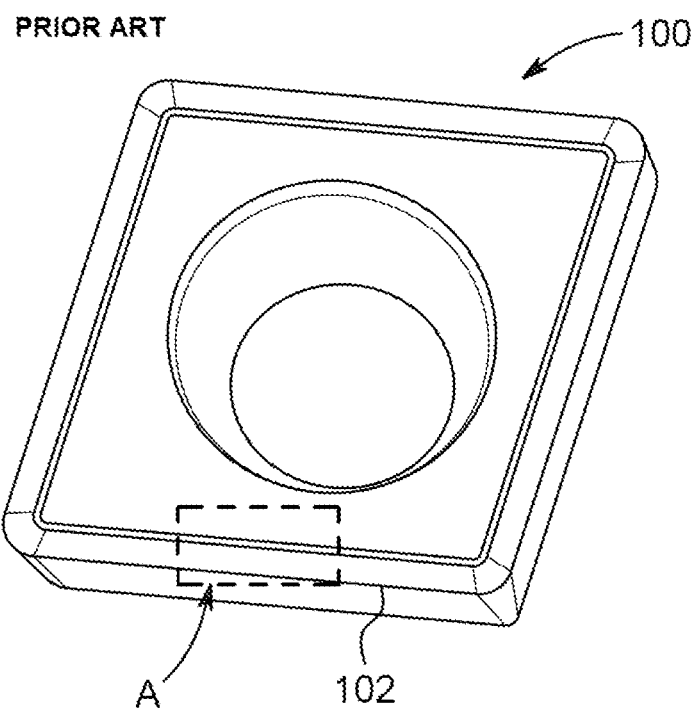
FIG. 1A is a perspective view of a conventional cutting insert.

In the drawings, like reference numerals designate identical or corresponding parts throughout the several views. Further, as used herein, the words "a," "an" and the like generally carry a meaning of "one or more," unless stated otherwise.

Furthermore, the terms "substantially," "approximately," "approximate," "about," and similar terms generally refer to ranges that include the identified value within a margin of 20%, 10%, or preferably 5%, and any values therebetween.

As used herein, the words "substantially," "approximately," "approximate," and "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), ±15% of the stated value (or range of values), or ±20% of the stated value (or range of values).

According to a first aspect, the present disclosure relates to a cutting insert for a cutting tool.

As used herein, cutting inserts are attachments to cutting tools for machining work pieces. Cutting inserts typically are replaceable attachments that have at least one cutting edge.

The cutting insert of the present disclosure has a substantially horizontal cylindrical segment shape, in which one or more cutting edges are formed at an intersection of a convex side and a generally planar surface. Unlike commercially available cutting inserts that have straight cutting edges, the presently disclosed cutting insert with convex-shaped cutting edges helps to decrease generation of end-burr during machining of metallic materials. As such, the present cutting insert helps to reduce the duration and cost of subsequent deburring processes and increases efficiency of machining operations.

Figure 1B:
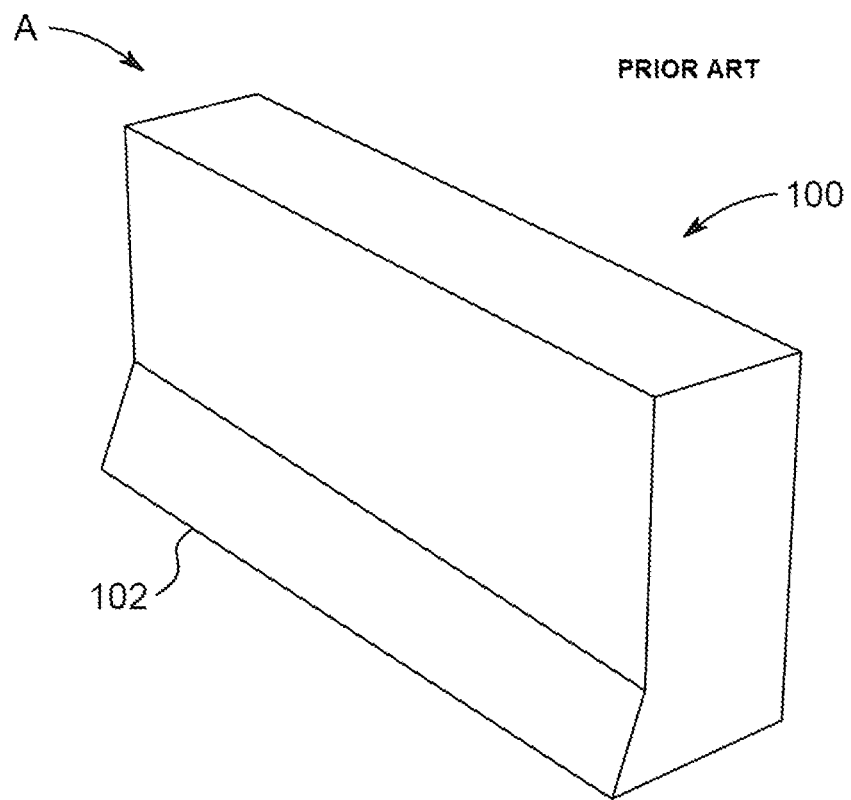
FIG. 1B is an enlarged view of a portion 'A' of the conventional cutting insert as shown in FIG. 1A.

Referring to FIG. 1A, a perspective view of a conventional cutting insert 100 is illustrated. The conventional cutting insert 100 is shown to be a square shaped cutting insert with multiple straight cutting edges 102. In other examples, the conventional cutting insert 100 may be triangular-shaped or rhombus-shaped, which also traditionally includes one or more straight cutting edges. Typically, a portion of the conventional cutting insert 100 including one of the cutting edges 102 is in contact with a workpiece to perform the cutting operation, such as a portion 'A' of the conventional cutting insert 100 as shown in FIG. 1A. Referring to FIG. 1B, an enlarged view of the portion 'A' of the cutting edge 102 of the conventional cutting insert 100 is illustrated. As may be seen from FIG. 1B, the cutting edge 102 (in the present example, bottom cutting edge) is defined at an intersection of a front surface and a bottom surface of the conventional cutting insert 100. With the front surface and the bottom surface of the conventional cutting insert 100 being generally orthogonal to each other, as shown in FIG. 1B, the cutting edge 102 of the conventional cutting insert 100 is a straight cutting edge.

Figure 2A:
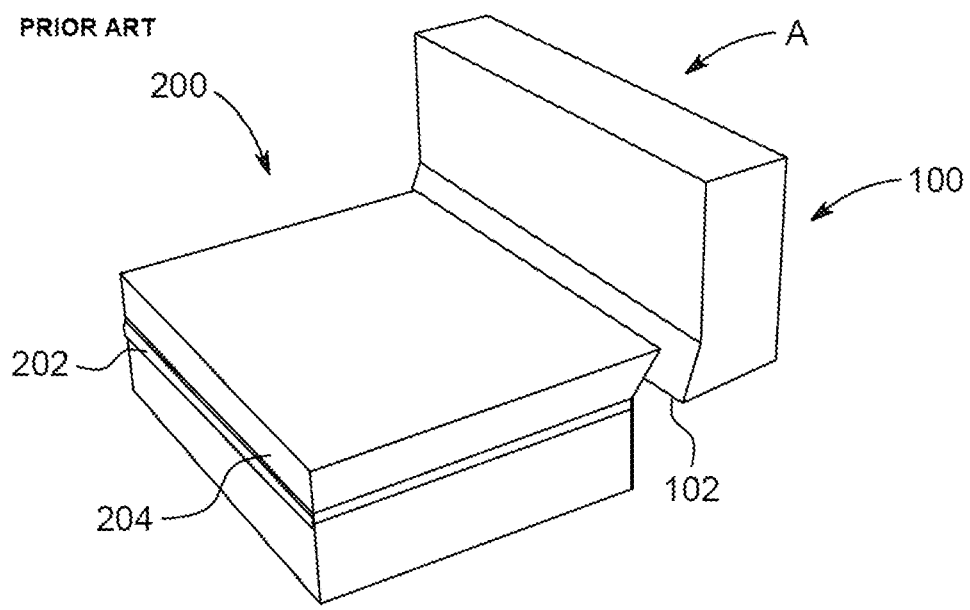
FIG. 2A is an exemplary illustration of a machining operation in which the conventional cutting insert of FIG. 1A, specifically the portion 'A' thereof, is implemented for machining a workpiece.

Referring to FIG. 2A, the conventional cutting insert 100, or specifically the portion 'A' thereof, is illustrated to be implemented for performing a machining operation on a workpiece 200. In the illustration of FIG. 2A, the machining operation is shown to be an orthogonal cutting operation being performed on the workpiece 200, as widely utilized in industrial processes, using the conventional cutting insert 100. For this purpose, as shown, the cutting insert 100 is oriented and positioned such that the cutting edge 102 of the cutting insert 100 is in contact with a section 202 of the workpiece 200. Specifically, the cutting edge 102 of the cutting insert 100 enters and exits through a region corresponding to the section 202 (as shown in FIG. 2A) of the workpiece 200, with the section 202 being located below a segment 204 of the workpiece 200 of certain thickness.

Figure 2B:
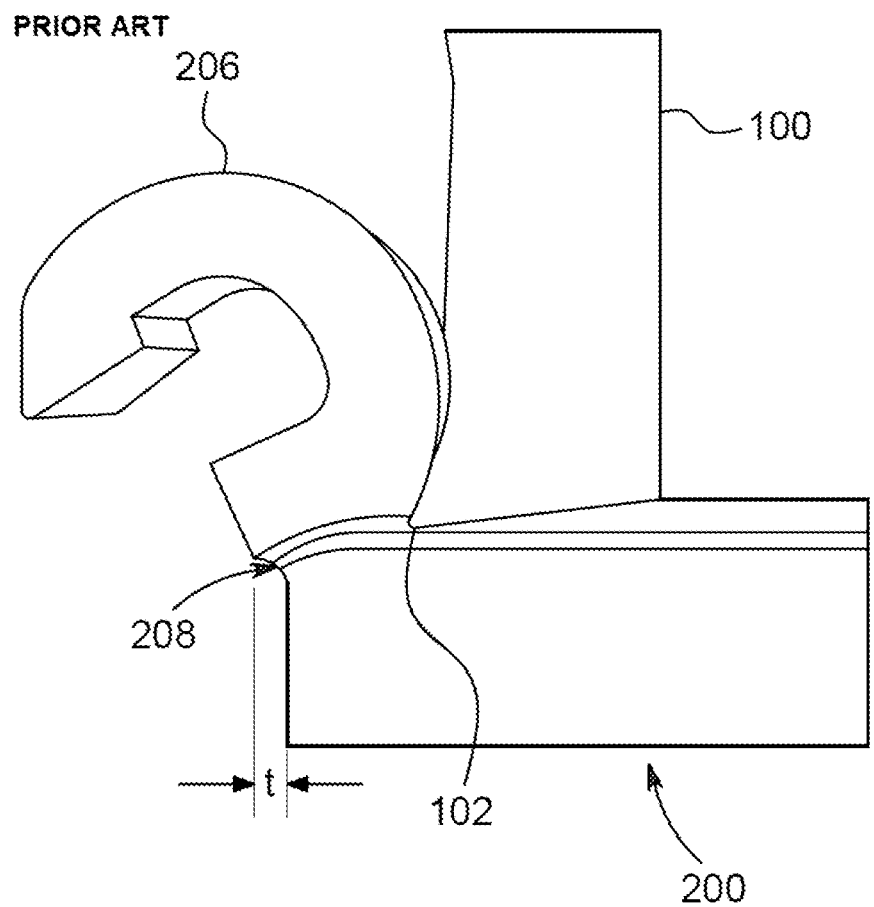
FIG. 2B is an exemplary illustration of burr formation during the machining operation using the conventional cutting insert of FIG. 1A.

Referring to FIG. 2B, as shown, during the machining operation, the segment 204 of the workpiece 200, as defined by the section 202, is removed from the workpiece 200 in the form of chip 206 being carved out of the workpiece 200. Further, as shown in FIG. 2B, a portion or a piece, usually a sharp and rough material, known as burr (represented by reference numeral 208), may be formed on the workpiece 200 as remains of the segment 204 that is left on the workpiece 200 during the machining operation. The burr 208 is typically formed at an edge of the section 202 of the workpiece 200 from which the cutting edge 102 exits after the machining operation. With the machining operation using the conventional cutting insert 100 (as described) with straight cutting edge 102, the burr 208 has a significant thickness, represented as thickness 't' in the illustration of FIG. 2B, which is undesirable, and thus needs to be removed using deburring processes which adds to time and cost of the machining operation.

Figure 2C:
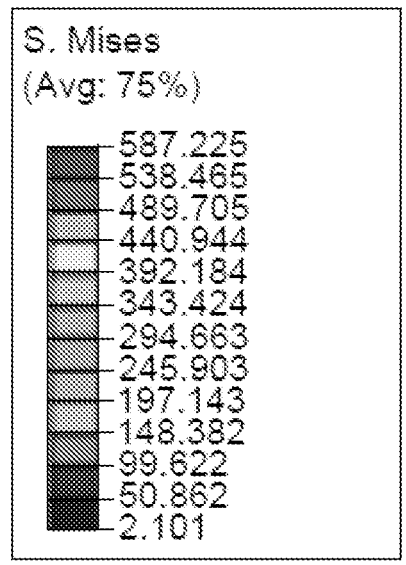
FIG. 2C is an exemplary illustration of a simulation depicting Von Mises stresses during the machining operation using the conventional cutting insert of FIG. 1A.
Figure 2C:
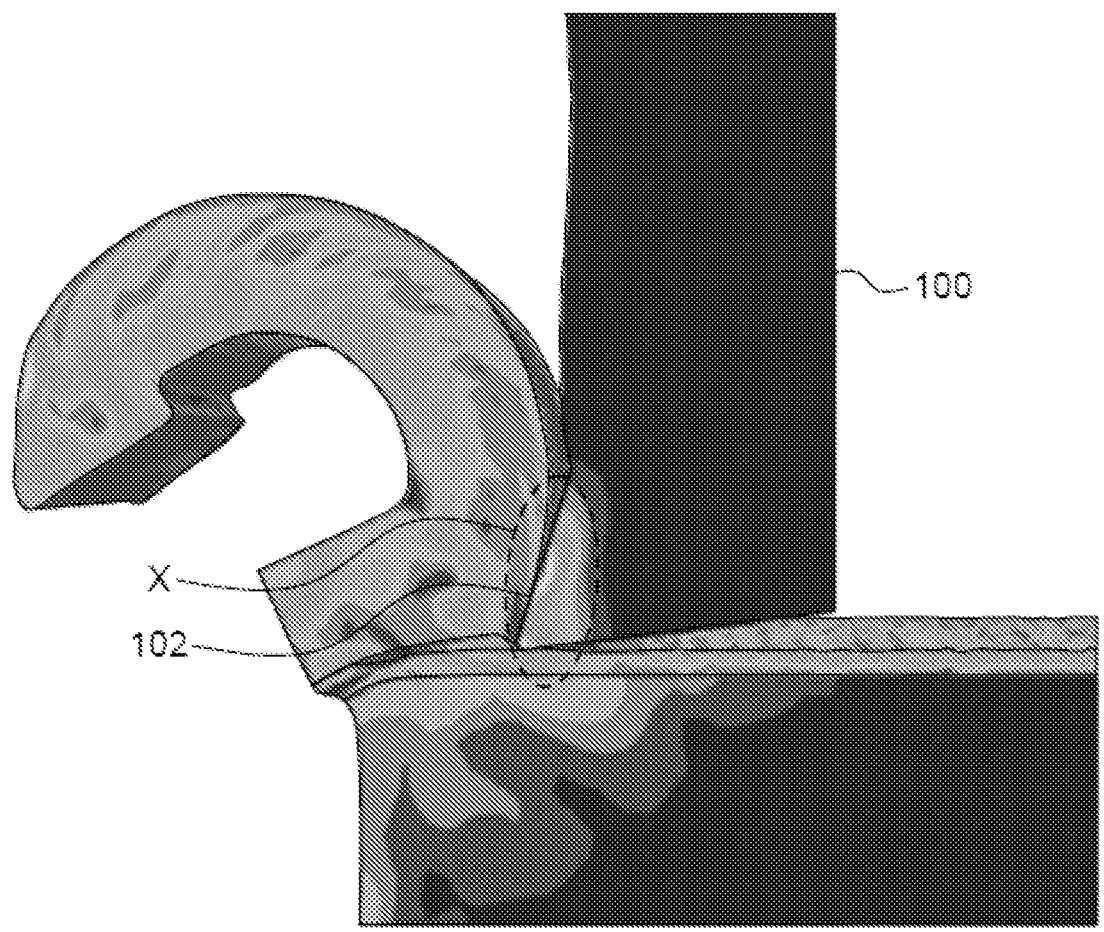

Further, FIG. 2C is an exemplary illustration of a simulation of the Von Mises stresses (S. Mises) encountered by the conventional cutting insert 100 during the machining operation. As shown, during the machining operation, the conventional cutting insert 100 may face significant Von Mises stresses (S. Mises), specifically in a region 'X' corresponding to the cutting edge 102. A Von Mises stress is a value that determines if a given material may yield or fracture. A high concentration of the Von Mises stress as shown at the cutting edge 102 suggests that the conventional cutting insert 100 may be prone to material failure in a given machining operation.

As defined herein, a horizontal cylindrical shape may be represented by a solid obtained by cutting a horizontal cylinder with a radius r by a single plane oriented perpendicular to circular planar ends of the horizontal cylinder. Preferably, when the cut makes a height h above the bottom of the horizontal cylinder, h is no greater than r.

Figure 3A:
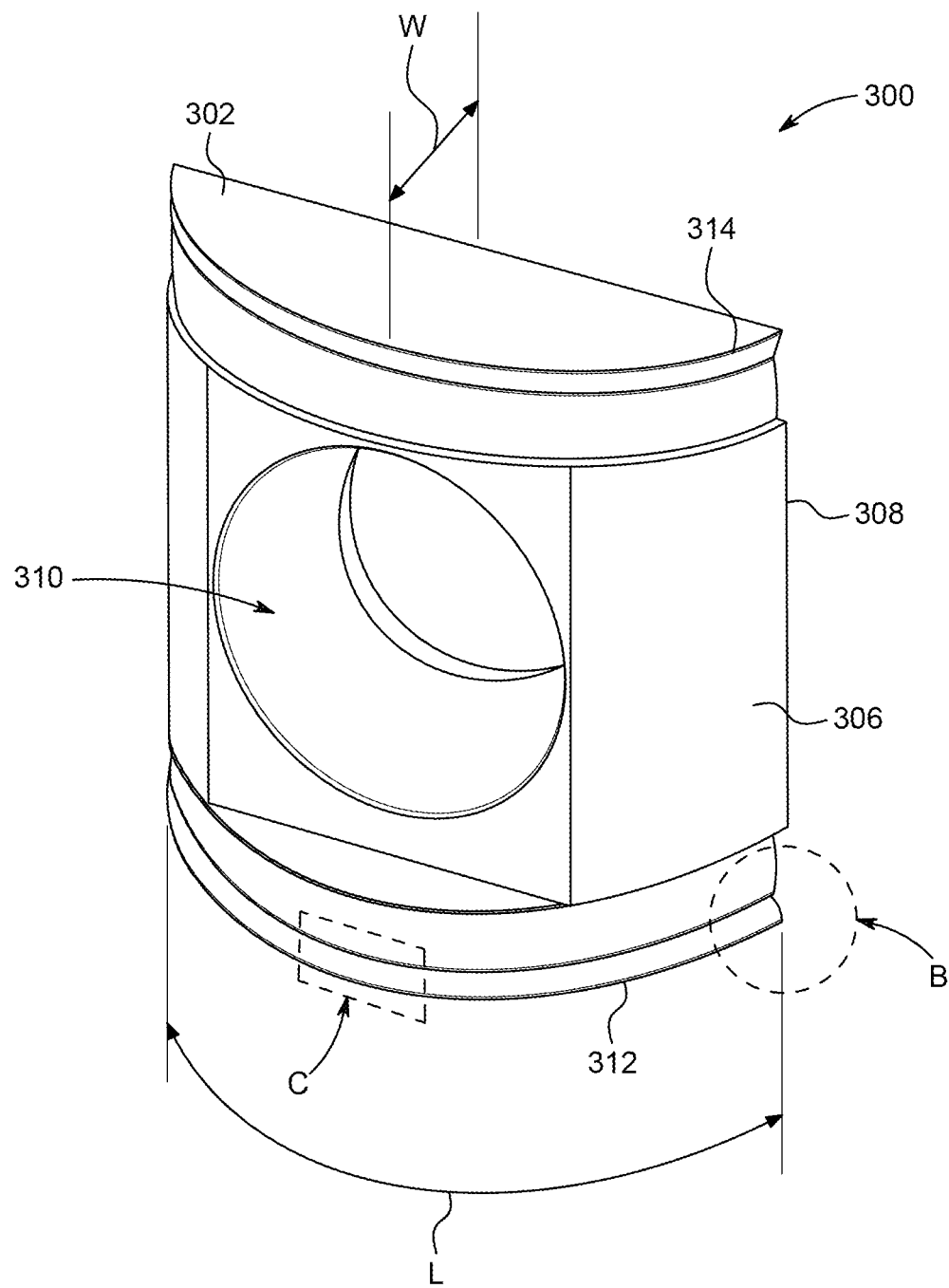
FIG. 3A is a perspective view of a cutting insert, according to certain embodiments.
Figure 3B:
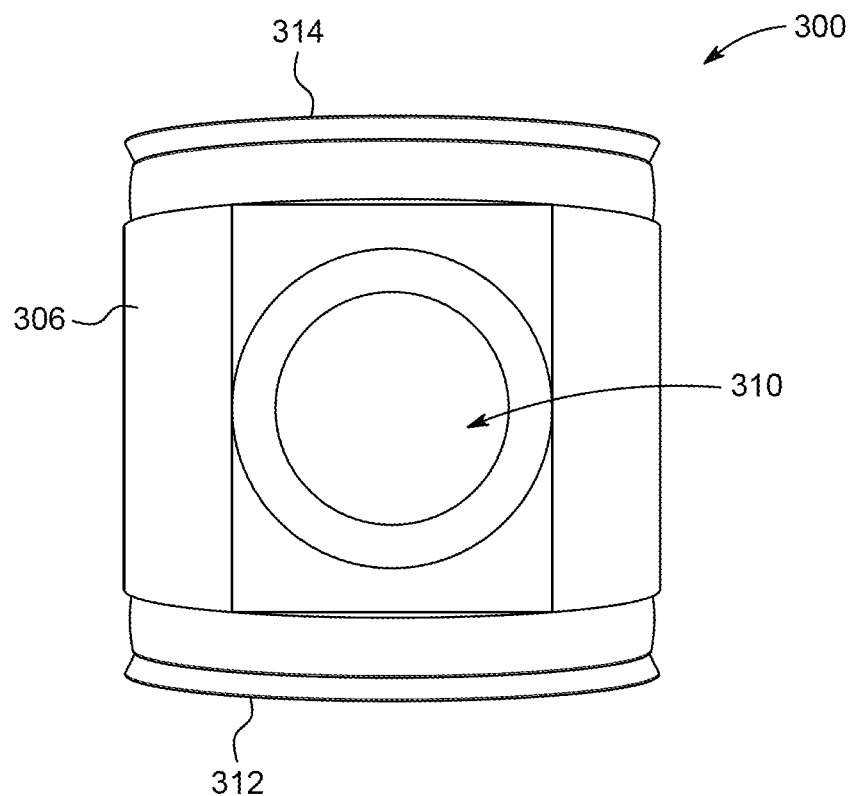
FIG. 3B is a front view of the cutting insert of FIG. 3A, according to certain embodiments.
Figure 3C:
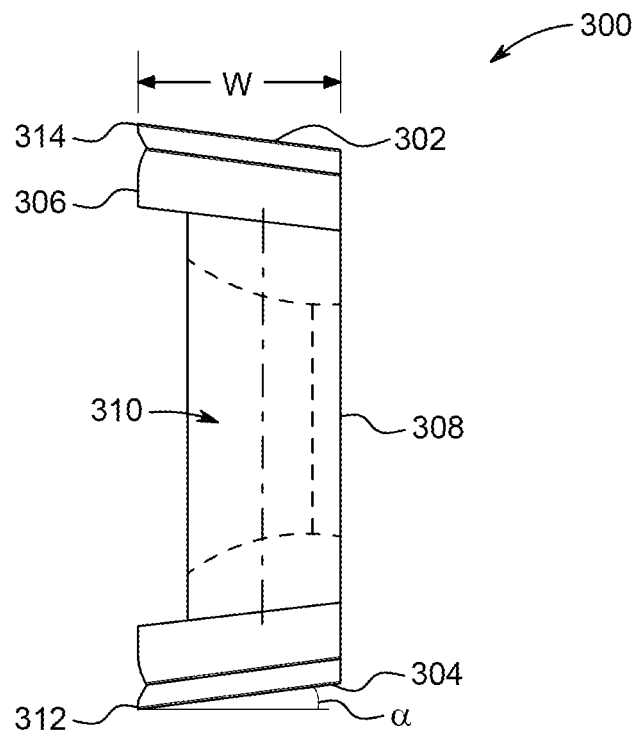
FIG. 3C is a side view of the cutting insert of FIG. 3A, according to certain embodiments.

Referring now to FIGS. 3A-3C, different views of a cutting insert 300 are illustrated. Further referring to FIGS. 3D and 3E, in combination with FIGS. 3A-3C, enlarged views of portions 'B' and 'C' respectively of the cutting insert 300 are illustrated. The cutting insert 300 of the present disclosure has a design that helps with attenuation of burr formation during machining of metallic materials. As may be seen, the cutting insert 300 has a substantially horizontal cylindrical segment shape. In some embodiments, the cutting insert 300 has a hemi-cylindrical shape. Such shapes for the cutting insert 300 may be achieved by a solid cut from a cylinder of certain length and certain radius by a single plane oriented parallel to the axis of symmetry of such cylinder. The cutting insert 300 of the present disclosure is formed of hard material to allow the cutting insert 300 to be used for machining operations. In an aspect of the present disclosure, the cutting insert 300 includes at least one hard material selected from the group consisting of a carbide, a cemented carbide, aluminum oxide, silicon nitride, cubic boron nitride, and diamond. That is, the cutting insert 300 may be formed using one or more of carbide, cemented carbide, aluminum oxide, silicon nitride, cubic boron nitride, and diamond. In some examples, the cutting insert 300 may be provided with coatings which may help to increase wear resistance and operational life thereof. Coatings for the cutting insert 300 may include, but not limited to, titanium nitride, titanium carbonitride, titanium aluminum nitride, aluminum titanium nitride, aluminum oxide, chromium nitride, zirconium nitride, and diamond DLC (Diamond-like carbon).

As illustrated, the cutting insert 300 includes top and bottom surfaces 302, 304 having a circular segment shape. With the cutting insert 300 having the substantially horizontal cylindrical segment shape, the top surface 302 and the bottom surface 304 may correspond to planar ends of the cylinder from which the cutting insert 300 may be formed. Herein, the circular segment shape refers to a two-dimensional surface that is bounded by an arc corresponding to periphery of the sides of the cylinder and by a chord corresponding to an edge of plane oriented parallel to the axis of symmetry of the cylinder from which the cutting insert 300 may be formed. The cutting insert 300 further includes a convex side 306. Again, with the cutting insert 300 having the substantially horizontal cylindrical segment shape, the convex side 306 may correspond to outer surface of the cylinder from which the cutting insert 300 may be formed. The cutting insert 300 further includes a flat side 308. Yet again, with the cutting insert 300 having the substantially horizontal cylindrical segment shape, the flat side 308 may correspond to the planar end parallel to the axis of symmetry of the cylinder from where the cutting insert 300 may have been cut.

In the present configuration, a thickness (W) of the cutting insert 300 is defined as a longest distance between the flat side 308 and the convex side 306. The longest distance is considered to be a line from the flat side 308 to periphery of the convex side 306 of the cutting insert 300, with such line being perpendicular to the flat side 308. As better illustrated in FIG. 3A, the thickness (W) corresponds to a sagitta (height) of the circular segment shape of the top surface 302 (or the bottom surface 304). In particular, the thickness (W) may correspond to the sagitta (height) of larger of the circular segment shape of the top surface 302 and the bottom surface 304. In an aspect of the present disclosure, the thickness (W) of the cutting insert 300 ranges from 2 mm to 20 mm, preferably from 2.5 mm to 15 mm, preferably from 3 mm to 10 mm, preferably from 4 mm to 8 mm, preferably from 4.5 mm to 6 mm. In a specific aspect of the present disclosure, the thickness of the cutting insert 300 is about 4.75 mm. Further, with the top and bottom surfaces 302, 304 having the circular segment shape, the curved arcs of the top and bottom surfaces 302, 304 (at the convex side 306) of the cutting insert 300 may be limited by an arc length, or simply length (L). Herein, the length (L) is defined as the distance between endpoints of the circular segment shapes of the top and bottom surfaces 302, 304. In an aspect of the present disclosure, the length (L) of the circular segment shape is about 12.6 mm.

Further, in an aspect of the present disclosure, as better shown in FIG. 3C, the top and bottom surfaces 302, 304 are not parallel to each other. That is, the top surface 302 and the bottom surface 304 of the cutting insert 300 may be formed such that at least one of the top and bottom surfaces 302, 304 may be angled other than 90 degrees with respect to the flat side 308. For instance, the cutting insert 300 may be formed as a horizontal cylindrical wedge (as known in the art) to have the configuration with the top and bottom surfaces 302, 304 not being parallel to each other. In an example, one of the top surface 302 and the bottom surface 304 may be tilted with respect to the flat side 308. In another example, both the top surface 302 and the bottom surface 304 may be tilted with respect to the flat side 308, either along same rotational direction (with different inclinations) or different rotational directions without any limitations. Such configuration for the cutting insert 300 may help to define a clearance angle therefor, as will be discussed later in the description.

Further, as illustrated, the cutting insert 300 includes a bottom cutting edge 312. The bottom cutting edge 312 is formed where the convex side 306 and the bottom surface 304 meet. With the bottom cutting edge 312 being formed at intersection of the planar bottom surface 304 and the convex side 306 of the cutting insert 300, the bottom cutting edge 312 is defined as a convex-shaped cutting edge in the cutting insert 300; in contrast to straight cutting edge (such as the cutting edge 102) in the conventional cutting insert 100. The cutting insert 300 may also include a top cutting edge 314. The top cutting edge 314 is formed where the convex side 306 and the top surface 302 meet. Similar to the bottom cutting edge 312, with the top cutting edge 314 being formed at intersection of the planar top surface 302 and the convex side 306 of the cutting insert 300, the top cutting edge 314 is also defined as a convex-shaped cutting edge in the cutting insert 300; in contrast to straight cutting edge (such as the cutting edge 102) in the conventional cutting insert 100.

In an example, the top and bottom cutting edges 314, 312 independently have a sharp edge or a round edge. In an alternate example, the top and bottom cutting edges 314, 312 each have a sharp edge. That is, in one example, the top and bottom cutting edges 314, 312 may both be sharp edges; and in other example, both the top and bottom cutting edges 314, 312 may be round edges; and in still other example, one of the top and bottom cutting edges 314, 312 may be round edge and other be sharp edge without any limitations. It may be appreciated by a person skilled in the art that whether a given edge is a sharp edge or a round edge may be defined by its tool edge radius. It may be understood that the tool edge radius significantly affects cutting forces required, cutting friction, tool wear, material deformation, and a variety of machining performance measures during machining operations. Therefore, it may be important to consider the tool edge radius, i.e., whether the top and bottom cutting edges 314, 312 may be the sharp edge or the round edge, for the cutting insert 300 depending on the type and requirements of machining operation to be performed thereby.

Figure 3D:
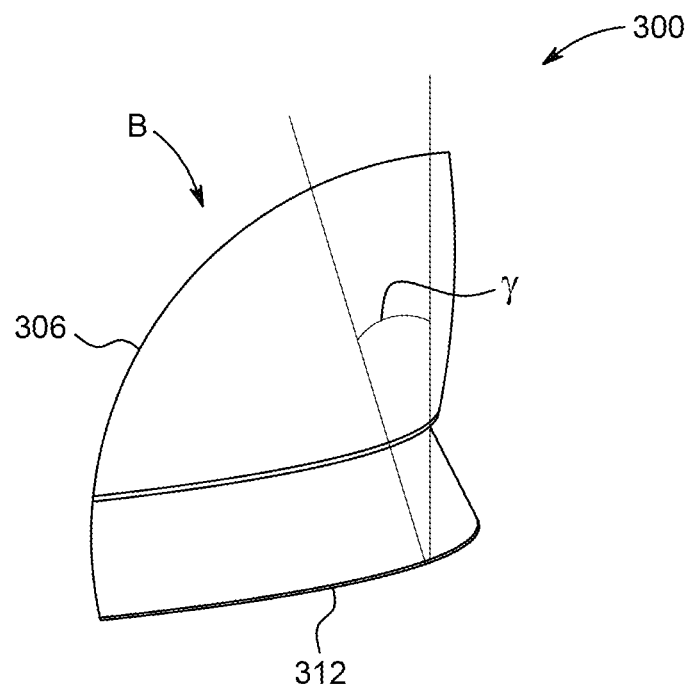
FIG. 3D is an enlarged view of a portion 'B' of the cutting insert as shown in FIG. 3A, according to certain embodiments.
Figure 3E:
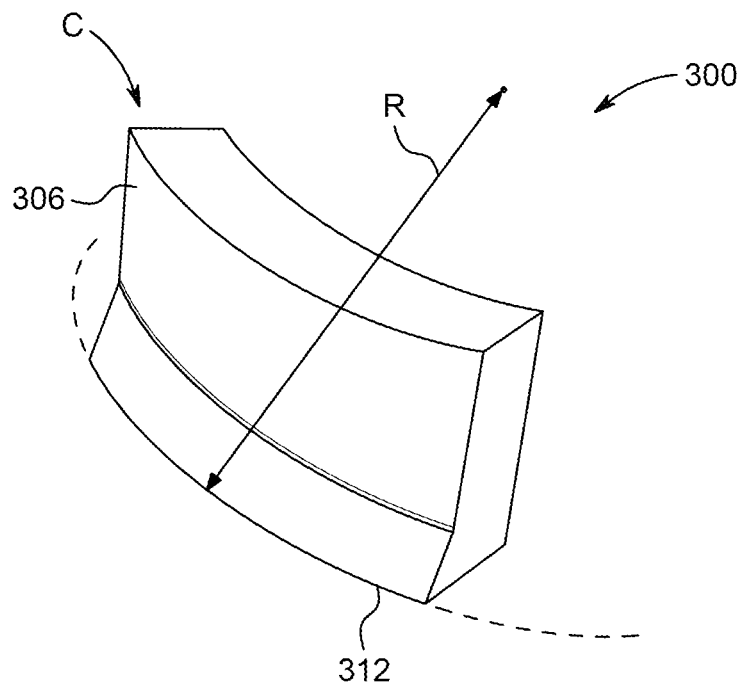
FIG. 3E is an enlarged view of a portion 'C' of the cutting insert as shown in FIG. 3A, according to certain embodiments.

With the bottom cutting edge 312 and the top cutting edge 314 being convex-shaped cutting edges in the cutting insert 300, each of the top and bottom cutting edges 314, 312 defines a curvature radius (R) (as shown in FIG. 3E). Herein, the curvature radius (R) is the radius of curvature which is equal to a radius of a circular arc which best approximates the curve defined by the top and bottom cutting edges 314, 312. In the present examples, the bottom cutting edge 312 and the top cutting edge 314 may have an equal curvature radius (R) or different respective curvature radiuses (R) without any limitations. In an aspect of the present disclosure, the top and bottom cutting edges 314, 312 have a curvature radius (R) ranging from about 4 mm to about 16 mm, preferably from about 5 mm to about 15 mm, preferably from about 6 mm to about 14 mm, preferably from about 7 mm to about 13 mm, preferably from about 8 mm to about 12 mm, preferably from about 9 mm to about 10 mm. In a specific aspect of the present disclosure, the top and bottom cutting edges 314, 312 have the curvature radius (R) ranging from about 6 mm to about 12 mm, preferably from about 7 mm to about 11 mm, preferably from about 8 mm to about 10 mm. In a more specific aspect of the present disclosure, the top and bottom cutting edges 314, 312 have the curvature radius (R) of about 6 mm, about 8 mm, or about 12 mm. That is, the top and bottom cutting edges 314, 312 have the respective curvature radius (R) value from one of about 6 mm, about 8 mm, or about 12 mm. In a certain aspect of the present disclosure, the top and bottom cutting edges 314, 312 have the curvature radius (R) of about 6 mm. It may be appreciated by a person skilled in the art, that the value(s) of the curvature radius (R) for the top and bottom cutting edges 314, 312 may be defined based the application and requirement of the cutting insert 300 for a given machining operation.

Also, it may be appreciated that geometry of the cutting insert 300 is an important factor that determines ease and performance of machining operation thereby. Primarily, the geometry of the cutting insert 300 is defined by its clearance angle ($\gamma$) and its rake angle ($\alpha$). As illustrated in FIG. 3C, the cutting insert 300 defines the clearance angle ($\gamma$) therefor which is generally defined as an angle between a principal flank surface of the cutting insert 300, which in this case may be the top surface 302 or the bottom surface 304 depending on which of the top cutting edge 314 or the bottom cutting edge 312 is being employed for performing the cutting operation, and cutting direction (generally, horizontal plane). Further, as illustrated in FIG. 3D, the cutting insert 300 defines the rake angle ($\alpha$) therefor. The rake angle ($\alpha$) is defined as an angle of orientation of tool's rake surface, which in this case is the orientation of the convex side 306, from the reference plane (generally, vertical plane).

In an aspect of the present disclosure, the cutting insert 300 has the clearance angle ($\gamma$) ranging from about 3 degrees to about 15 degrees, preferably from about 5 degrees to about 12 degrees, more preferably from about 6 degrees to about 10 degrees. In a specific aspect of the present disclosure, the cutting insert 300 has the clearance angle (γ) of about 7 degrees.

Further, in an aspect of the present disclosure, the top and bottom cutting edges 314, 312 independently have a positive rake angle (α), or a negative rake angle (α). It may be noted that depending on the inclination/elevation of rake surface from the reference plane, the rake angle (α) may have either positive or negative, or even zero value. With positive rake angle (α), the cutting insert 300 requires less cutting force and thus lower power requirement for the machining operation, and also results in less chip deformation during the machining operation; however, operational life of the employed cutting edge 312, 314 therein is reduced. On the other hand, with negative rake angle (α), the cutting insert 300 offers a strong tool tip which makes the employed cutting edge 312, 314 more resilient under impact loading; however, shear deformation of the chip becomes higher and thus higher cutting force may be required during the machining operation. In a preferred aspect of the present disclosure, the top and bottom cutting edges 314, 312 each have a positive rake angle (α). In a specific aspect of the present disclosure, the top and bottom cutting edges 314, 312 each have a positive rake angle (α) ranging from about 5 degrees to about 25 degrees, preferably from about 10 degrees to about 23 degrees, more preferably from about 15 degrees to about 22 degrees, or about 20 degrees. In a more specific aspect of the present disclosure, the top and bottom cutting edges 314, 312 each have a positive rake angle (α) of about 18 degrees.

Figure 4A:
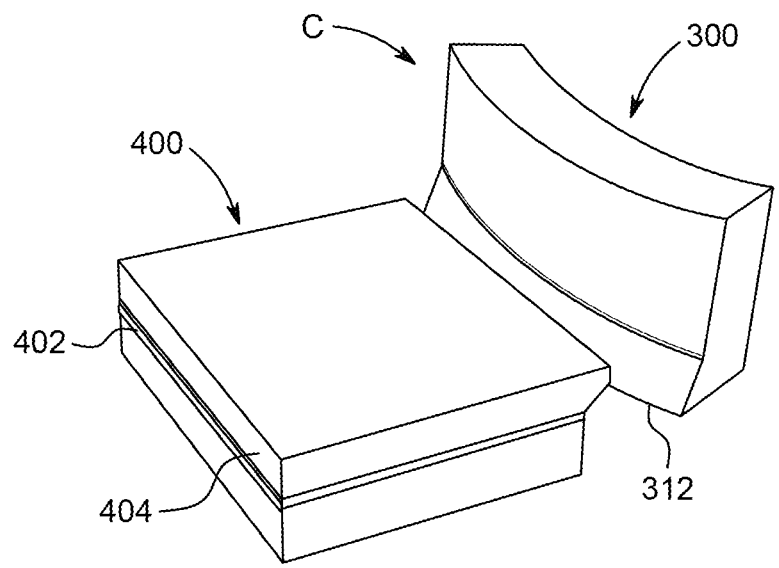
FIG. 4A is an exemplary illustration of a machining operation in which the cutting insert of FIG. 3A, specifically the portion 'C' thereof, is implemented for machining a workpiece, according to certain embodiments.

Referring now to FIG. 4A, the cutting insert 300, or specifically the portion 'C' thereof, is illustrated to be implemented for performing a machining operation on a workpiece 400. In the illustration of FIG. 4A, the workpiece 400 is shown to be a generally cuboidal block; however, it may be appreciated that the workpiece 400 may be of any other shape which needs to undergo machining operation. Further, the machining operation is shown to be an orthogonal cutting operation being performed on the workpiece 400, as widely utilized in industrial processes, using the cutting insert 300; however, the machining operation should not be limited to orthogonal cutting operation and in other examples, the machining operation may include other suitable cutting operation, such as drilling operation without any limitations. For performing machining operation, as shown, the cutting insert 300 is oriented and positioned such that the cutting edge, specifically the bottom cutting edge 312, of the cutting insert 300 is in contact with a section 402 of the workpiece 400. Although the present example has been described in terms of the machining operation being performed by the bottom cutting edge 312 of the cutting insert 300; in other example, the top cutting edge 314 of the cutting insert 300 may be implemented for performing the described machining operation and same results may be achieved without departing from the spirit and the scope of the present disclosure. Specifically, as shown in FIG. 4A, the bottom cutting edge 312 of the cutting insert 300 enters and exits through a region corresponding to the section 402 (as shown in FIG. 4A) of the workpiece 400, with the section 402 being located below a segment 404 of the workpiece 400 of certain thickness.

Figure 4B:
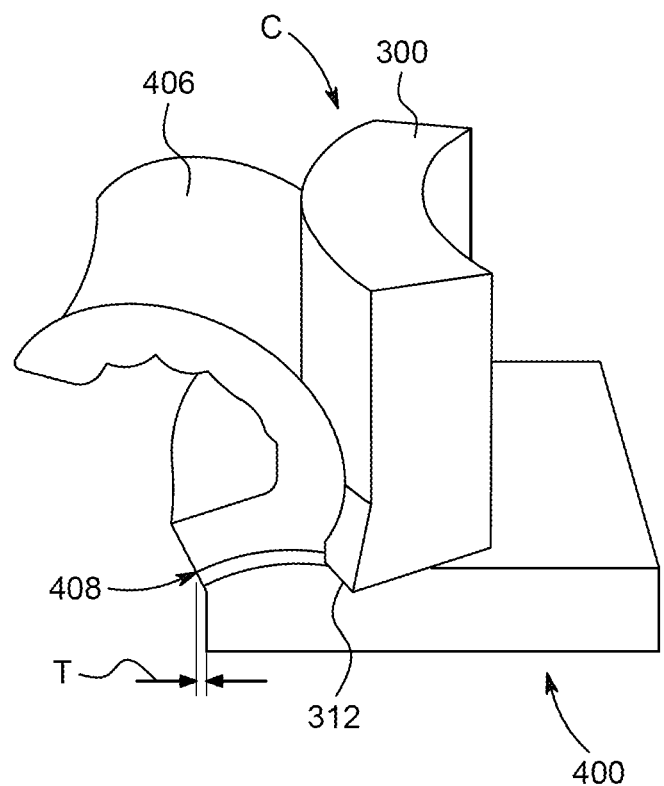
FIG. 4B is an exemplary illustration of possible burr formation during the machining operation using the cutting insert of FIG. 3A, according to certain embodiments.

Referring to FIG. 4B, as shown, during the machining operation, the segment 404 of the workpiece 400, as defined by the section 402, is removed from the workpiece 400 in the form of chip 406 being carved out of the workpiece 400. Further, as shown in FIG. 4B, a portion or a piece, usually a sharp and rough material, known as burr (represented by reference numeral 408), may possibly be formed on the workpiece 400 as remains of the segment 404 that is left on the workpiece 400 during the machining operation. It may be noted that the burr 408 is also referred to as "exit-burr" or "end-burr" in the art, with such terms being interchangeably used without any limitations. The burr 408 may be formed at an edge of the section 402 of the workpiece 400 from which the bottom cutting edge 312 exits after the machining operation. With the current machining operation, as illustrated in FIG. 4B, using the convex-shaped cutting edge 312 of the present cutting insert 300, the possibly formed burr 408 has a significantly reduced thickness (represented as thickness 'T' in the illustration of FIG. 4B) compared to the thickness 't' of the burr 208 (as shown in FIG. 2B) formed during the machining operation using the straight cutting edge 102 of the conventional cutting insert 100.

Figure 4C:
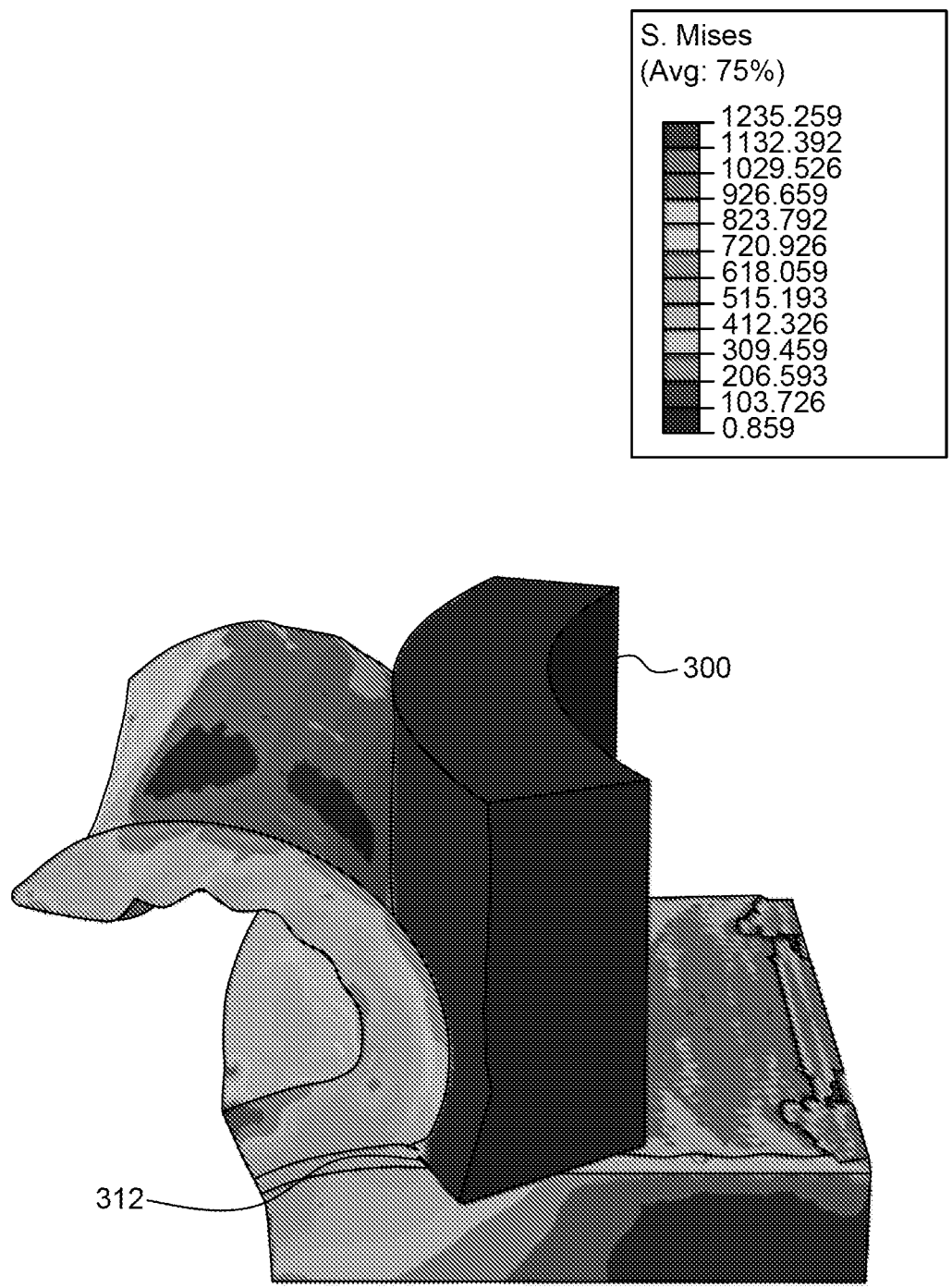
FIG. 4C is an exemplary illustration of a simulation depicting Von Mises stresses during the machining operation using the cutting insert of FIG. 3A, according to certain embodiments.

Further, FIG. 4C is an exemplary illustration of a simulation of the Von Mises stresses (S. Mises) encountered by the cutting insert 300 of the present disclosure during the machining operation. As shown, during the machining operation, the cutting insert 300 may face comparatively lower Von Mises stresses (S. Mises) at its cutting edge, such as the bottom cutting edge 312, compared to the conventional cutting insert 100 (as depicted in FIG. 2C). As discussed above, since the Von Mises stress is a value used to determine if a given material may yield or fracture, with lower concentration of the Von Mises stress at the cutting edge 312 (as shown), the present cutting insert 300 is less prone to material failure in a given machining operation.

Further, as illustrated in FIGS. 3A-3C, the cutting insert 300 includes a hole 310 extending from the convex side 306 towards the flat side 308. That is, the hole 310 is defined to be extending from the convex side 306 through the flat side 308. The hole 310 may be formed by drilling of a through-hole in the cutting insert 300, extending from the convex side 306 through the flat side 308. In an aspect, the hole 310 is positioned at a center of a surface of the flat side 308. In an example, the center of the surface of the flat side 308 may be a diagonal center of the surface of the flat side 308.

According to another aspect, the present disclosure relates to a cutting tool that includes a tool body having an insert mounting seat, and the cutting insert of the first aspect being detachably mounted on the insert mounting seat. In some embodiments, the cutting tool may further include an insert holder. Preferably, the insert holder has a lateral mating surface complementary to the hole 310 of the cutting insert, and the cutting insert is detachably mounted on the insert mounting seat via the insert holder. As such, the hole 310 may be utilized to support the cutting insert 300 in a cutting tool. For instance, the present cutting insert 300 may be mounted onto an insert holder (e.g., a shaft) of the cutting tool, by passing the said insert holder (e.g., the shaft) through the hole 310 and securing the cutting insert 300 thereto by using a fastener.

Figure 5:
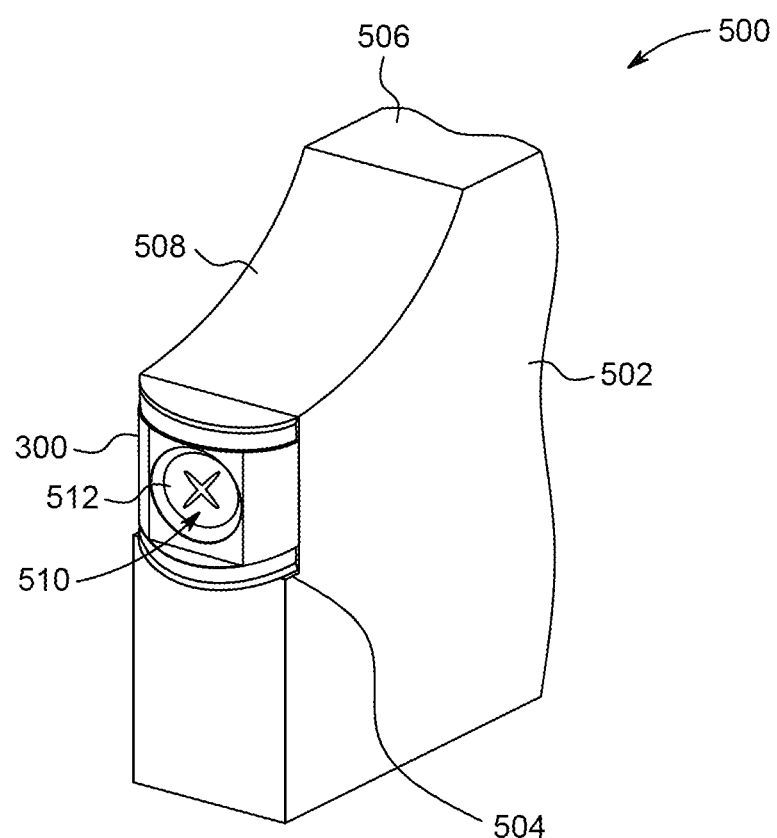
FIG. 5 is a perspective view of a cutting tool employing the cutting insert of FIG. 3A, according to certain embodiments.

FIG. 5 is a perspective view of an exemplary cutting tool 500 employing the cutting insert 300. As shown, the cutting tool 500 has a tool body 502. The tool body 502 provides an insert mounting seat 504. Further, as shown, the cutting insert 300 is detachably mounted on the insert mounting seat 504. A top side 506 of the tool body 502 is embodied with a face extension 508 for the cutting insert 300, which runs upward in a curved manner and helps with chip disposal. Also, as shown, the cutting tool 500 includes an insert holder 510. The insert holder 510 has a lateral mating surface 512 complementary to the hole 310 of the cutting insert 300. The cutting insert 300 is detachably mounted on the insert mounting seat 504 via the insert holder 510. In the illustrated example, the insert holder 510 is shown in the form of a clamping screw. However, in addition to the clamping screw, other insert holders for fastening purposes may also be used in the cutting tool.

Figure 6:
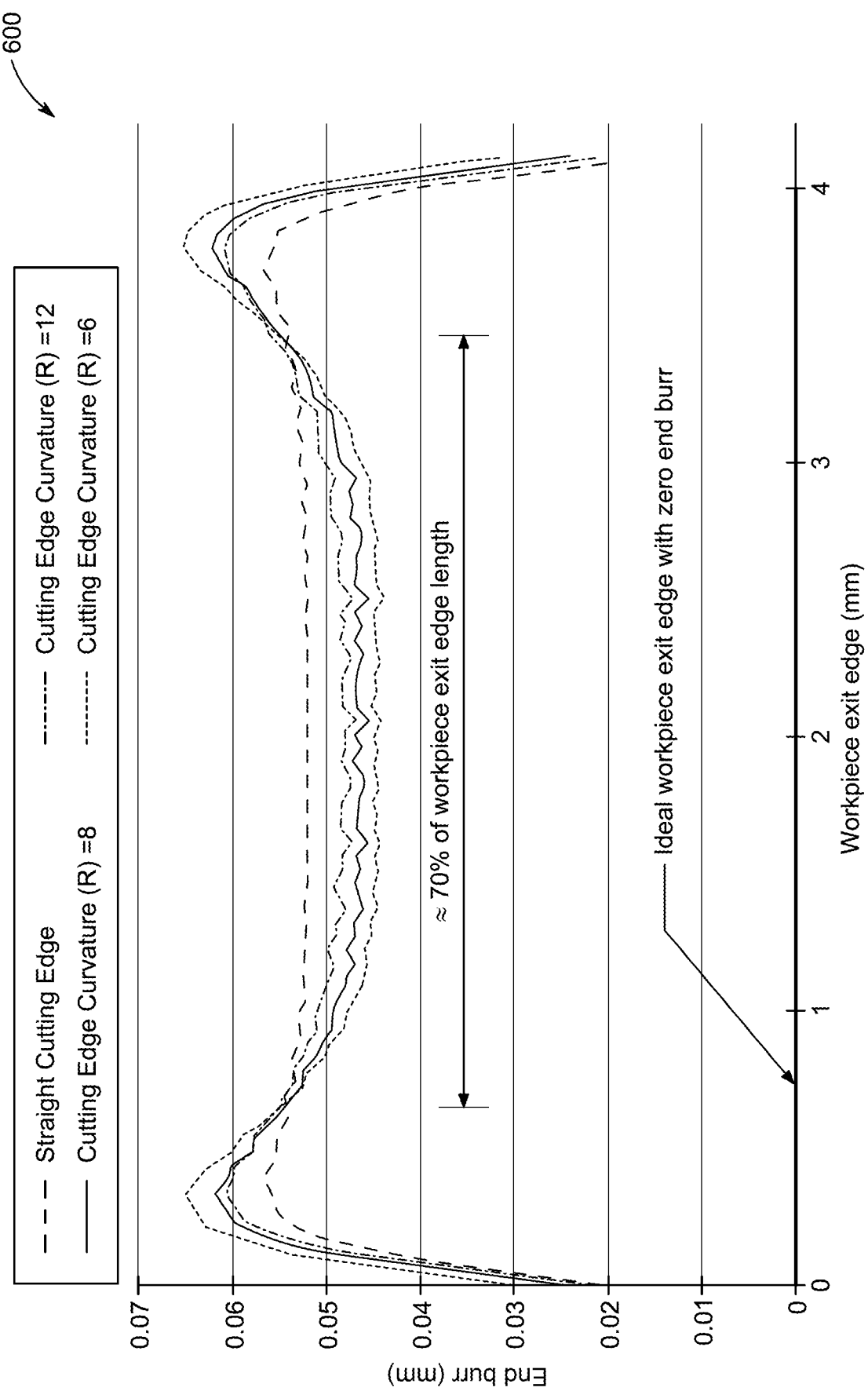
FIG. 6 is an exemplary graph depicting comparative quantification of burr formation for a straight cutting edge and convex-shaped cutting edges of different curvatures, according to certain embodiments.

FIG. 6 is an exemplary graph 600 depicting comparative quantification of burr formation for a straight cutting edge and convex-shaped cutting edges of different curvatures. The graph 600 represents burr formation (in millimeters (mm)) along vertical axis and workpiece exit edge (in millimeters (mm)) along horizontal axis. In the graph 600, approximately 70% of the workpiece exit length is being considered. As shown, in an ideal machining operation, the workpiece exit edge may have zero burr formation. As may be seen from the graph 600, for a straight cutting edge (such as the cutting edge 102 in the conventional cutting insert 100), the end burr is higher than 0.055 mm for the workpiece exit edge of about 1 mm to 3 mm. Further, as may be seen from the graph 600, for convex-shaped cutting edges (such as the cutting edge 312, 314 in the cutting insert 300 of the present disclosure) for each of the employed curvatures (R), the end burrs are significantly lower compared to the straight cutting edge. For example, for the convex-shaped cutting edge with the curvature radius (R) of about 12 mm, the end burr is about 0.0475; for the convex-shaped cutting edge with the curvature radius (R) of about 8 mm, the end burr is about 0.0450; and for the convex-shaped cutting edge with the curvature radius (R) of about 6 mm, the end burr is about 0.0425. It may be noted that in each of the given examples, the end burr formation in the convex-shaped cutting edges as described for the cutting insert 300 of the present disclosure is significantly lower compared to the straight cutting edge of the conventional cutting insert 100.

It may be appreciated that the machining operations, particularly when the casting is formed of nonferrous material, such as an aluminum or a magnesium alloy, result in the formation of burrs at the intersections of the passages. Such burrs needs to be completely removed before the device is assembled and placed in use, because the burrs are subject to break away in course of use, and may possibly enter a fluid line, where they may cause serious damage by blocking fluid flow through restricted ports, etc., or become lodged in the path of moving parts of the device. It has been suggested that the cause of burrs remaining is that the force to bend a small portion of the workpiece adjacent to the edge exceeds the shearing force to cut off the portion, and that the small portion of the workpiece being bent by the cutting edge of the cutter insert toward the feeding direction of the face milling cutter prior to being cut off thoroughly by the cutting edge. The proposed convex-shaped cutting insert 300 of the present disclosure, instead of straight-edge cutting insert 100 (that are commercially available and commonly used in machining processes), due to its unique shape of the cutting edge 312, 314, may help to decrease the end-burr generation during machining of metallic materials, and thus reduce the time and cost incurred in deburring processes and hence increase productivity by curtailing the time, cost and energies incurred in deburring processes. Moreover, the present cutting insert 300 would be beneficial in decreasing total energy foot-print in the overall machining operation.

The embodiment of the present disclosure is illustrated with respect to FIG. 3A through FIG. 6. One embodiment describes the cutting insert 300 of the substantially horizontal cylindrical segment shape. The cutting insert 300 comprising the top and bottom surfaces 302, 304 having the circular segment shape; the convex side 306; the flat side 308; the top cutting edge 314 which is formed where the convex side 306 and the top surface 302 meet; the bottom cutting edge 312 which is formed where the convex side 306 and the bottom surface 304 meet; and the hole 310 extending from the convex side 306 towards the flat side 308, where the hole 310 is positioned at the center of the surface of the flat side 308.

The cutting insert 300, wherein the top and bottom surfaces 302, 304 are not parallel to each other.

The cutting insert 300, wherein the top and bottom cutting edges 314, 312 have the curvature radius (R) ranging from about 4 mm to about 16 mm. The cutting insert 300, wherein the top and bottom cutting edges 314, 312 have the curvature radius (R) ranging from about 6 mm to about 12 mm. The cutting insert 300, wherein the top and bottom cutting edges 314, 312 have the curvature radius (R) of about 6 mm, about 8 mm, or about 12 mm. The cutting insert 300, wherein the top and bottom cutting edges 314, 312 have the curvature radius (R) of about 6 mm. In some embodiments, the cutting insert 300, wherein the length (L) of the circular segment shape is ranging from about 8 to about 16 mm, preferably from about 10 to about 14 mm, more preferably from about 12 to about 13 mm, or about 12.6 mm.

The cutting insert 300, wherein the top and bottom cutting edges 314, 312 independently have the positive rake angle ($\alpha$), or the negative rake angle ($\alpha$). The cutting insert 300, wherein the top and bottom cutting edges 314, 312 each have the positive rake angle ($\alpha$). The cutting insert 300, wherein the top and bottom cutting edges 314, 312 each have the positive rake angle ($\alpha$) ranging from about 5 degrees to about 25 degrees. The cutting insert 300, wherein the top and bottom cutting edges 314, 312 each have the positive rake angle ($\alpha$) of about 20 degrees. The cutting insert 300, which has the clearance angle ($\gamma$) ranging from about 3 degrees to about 15 degrees. The cutting insert 300, which has the clearance angle ($\gamma$) of about 7 degrees.

The cutting insert 300, wherein the thickness (W) of the cutting insert 300 ranges from 2 mm to 20 mm, wherein the thickness (W) is the longest distance between the flat side 308 and the convex side 306, and the longest distance is perpendicular to the flat side 308. The cutting insert 300, wherein the thickness (W) of the cutting insert 300 is about 4.75 mm.

The cutting insert 300, wherein the top and bottom cutting edges 314, 312 independently have the sharp edge or the round edge. The cutting insert 300, wherein the top and bottom cutting edges 314, 312 each have the sharp edge.

The cutting insert 300, comprising at least one hard material selected from the group consisting of the carbide, the cemented carbide, aluminum oxide, silicon nitride, cubic boron nitride, and diamond.

Another embodiment describes the cutting tool 500 including the tool body 502 having an insert mounting seat 504, and the cutting insert 300 being detachably mounted on the insert mounting seat 504.

The cutting tool may further include the insert holder 310, where the insert holder 310 has the lateral mating surface 512 complementary to the hole 310 of the cutting insert 300, and the cutting insert 300 is detachably mounted on the insert mounting seat 504 via the insert holder 310.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A cutting insert of a substantially horizontal cylindrical segment shape, comprising:

top and bottom surfaces having a circular segment shape;
a convex side;
a flat side;
a top cutting edge which is formed where the convex side and the top surface meet;
a bottom cutting edge which is formed where the convex side and the bottom surface meet; and
a hole extending from the convex side towards the flat side, wherein the hole is positioned at a center of a surface of the flat side,
wherein the insert has a hemicylindrical shape with a planar inset on the convex side, a plane of the planar inset being parallel to a plane of the flat side,
wherein the convex side includes a convex surface portion that extends radially beyond the planar inset on the convex side,
wherein the top and bottom surfaces are not parallel to each other,
wherein the top and bottom cutting edges have a curvature radius (R) in a range of from 4 mm to 16 mm, and
wherein the top and bottom cutting edges each have a positive rake angle in a range of from 5 to 25°.

2. The cutting insert of claim 1, wherein the top and bottom cutting edges have a curvature radius (R) is in a range of from 6 mm to 12 mm.

3. The cutting insert of claim 1, wherein the top and bottom cutting edges have a curvature radius (R) of 6 mm.

4. The cutting insert of claim 1, wherein the top and bottom cutting edges have a curvature radius (R) of 8 mm.

5. The cutting insert of claim 4, wherein a length of the circular segment shape is 12.6 mm.

6. The cutting insert of claim 1, wherein the top and bottom cutting edges independently have a positive rake angle, or a negative rake angle.

7. The cutting insert of claim 6, wherein the top and bottom cutting edges each have the positive rake angle.

8. The cutting insert of claim 1, wherein the top and bottom cutting edges each have a positive rake angle of 20°.

9. The cutting insert of claim 1, which has a clearance angle in a range of from 3 to 15°.

10. The cutting insert of claim 9, which has a clearance angle of 7°.

11. The cutting insert of claim 1, wherein a thickness of the cutting insert is in a range of from 2 mm to 20 mm,
wherein the thickness is a longest distance between the flat side and the convex side, and the longest distance is perpendicular to the flat side.

12. The cutting insert of claim 11, wherein the thickness of the cutting insert is 4.75 mm.

13. The cutting insert of claim 1, wherein the top and bottom cutting edges independently have a sharp edge or a round edge.

14. The cutting insert of claim 13, wherein the top and bottom cutting edges each have a sharp edge.

15. The cutting insert of claim 1, comprising a carbide, a cemented carbide, aluminum oxide, silicon nitride, cubic boron nitride, and/or diamond.

16. A cutting tool, comprising:
a tool body having an insert mounting seat; and
the cutting insert of claim 1 being detachably mounted on the insert mounting seat.

17. The cutting tool of claim 16, further comprising:
an insert holder,
wherein the insert holder includes a lateral mating surface complementary to the hole of the cutting insert, and
wherein the cutting insert is detachably mounted on the insert mounting seat via the insert holder.

18. The cutting insert of claim 1, wherein the top and bottom cutting edges have a curvature radius (R) of 12 mm.

19. The cutting insert of claim 1, comprising a carbide.

20. The cutting insert of claim 1, comprising silicon nitride.

* * * * *